(12) United States Patent
Song et al.

(10) Patent No.: US 7,457,635 B2
(45) Date of Patent: Nov. 25, 2008

(54) MODEM SHARING DEVICE OF PDA PHONE AND METHOD THEREOF

(75) Inventors: Dong-Sub Song, Seoul (KR); Joy Yim, Seoul (KR)

(73) Assignee: LG Electronics Inc., Seoul (KR)

( * ) Notice: Subject to any disclaimer, the term of this patent is extended or adjusted under 35 U.S.C. 154(b) by 492 days.

(21) Appl. No.: 11/054,970

(22) Filed: Feb. 9, 2005

(65) Prior Publication Data

US 2005/0207546 A1   Sep. 22, 2005

(30) Foreign Application Priority Data

Mar. 17, 2004   (KR) ...................... 10-2004-0018113

(51) Int. Cl.
*H04M 1/00* (2006.01)
*H04B 1/38* (2006.01)

(52) U.S. Cl. .................. 455/556.1; 455/556.2; 455/557

(58) Field of Classification Search ............. 455/556.1, 455/556.2, 557, 550.1, 73, 74, 344, 90.3, 455/575.1

See application file for complete search history.

(56) References Cited

U.S. PATENT DOCUMENTS

| | | | | |
|---|---|---|---|---|
| 4,040,014 A | * | 8/1977 | Gehrking | 375/222 |
| 4,665,519 A | * | 5/1987 | Kirchner et al. | 370/349 |
| 5,699,357 A | * | 12/1997 | Carvey | 370/347 |
| 5,790,895 A | * | 8/1998 | Krontz et al. | 710/64 |
| 5,884,103 A | | 3/1999 | Terho et al. | |
| 6,112,266 A | * | 8/2000 | Yeh | 710/52 |
| 6,128,290 A | * | 10/2000 | Carvey | 370/347 |
| 6,353,857 B2 | * | 3/2002 | Bader et al. | 709/246 |
| 6,957,069 B2 | * | 10/2005 | Shah et al. | 455/436 |
| 7,016,673 B2 | * | 3/2006 | Reddy et al. | 455/426.2 |
| 7,239,874 B2 | * | 7/2007 | Reddy et al. | 455/436 |
| 2001/0052026 A1 | | 12/2001 | Bader et al. | |

FOREIGN PATENT DOCUMENTS

| | | | |
|---|---|---|---|
| GB | 2 348 088 A | | 9/2000 |
| GB | 2348088 A | * | 9/2000 |

* cited by examiner

*Primary Examiner*—Sonny Trinh
(74) *Attorney, Agent, or Firm*—Lee, Hong, Degerman, Kang & Waimey

(57) ABSTRACT

Disclosed are a modem sharing device of a PDA phone capable of efficiently sharing a modem by constructing one parsing module respectively attached to a plurality of applications of the PDA phone in order to parse commands of the plurality of applications, and a method thereof. The modem sharing device of a PDA phone comprises: a plurality of applications; one parsing module for parsing commands generated by the plurality of applications and distributing; a transmission module for transmitting the distributed commands through one port; and a modem for receiving the transmitted commands.

36 Claims, 4 Drawing Sheets

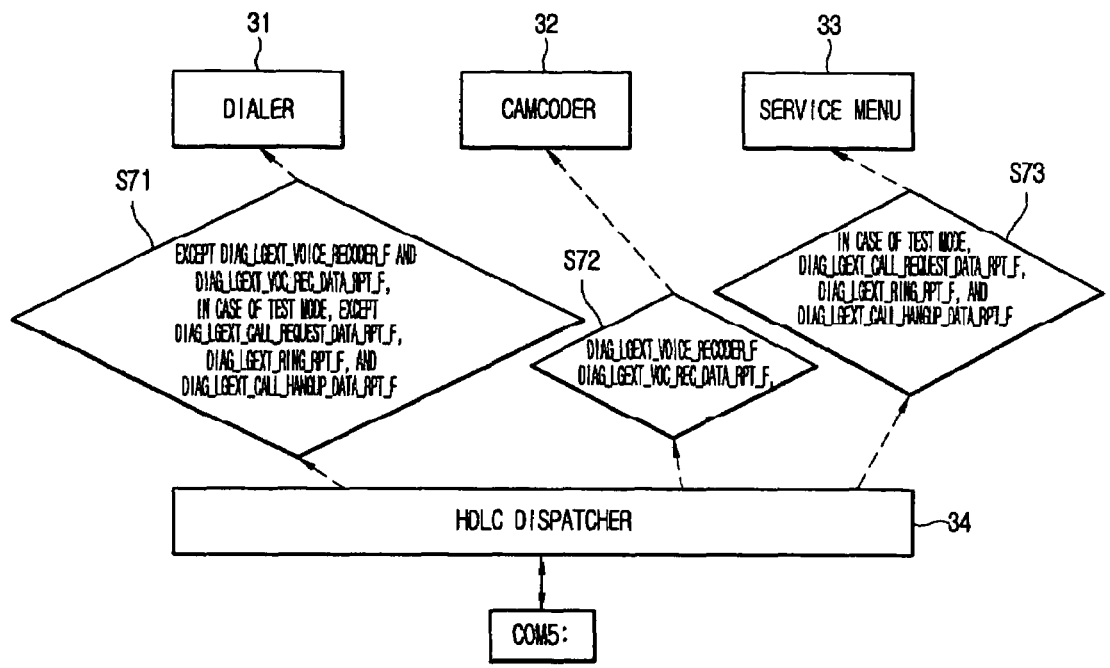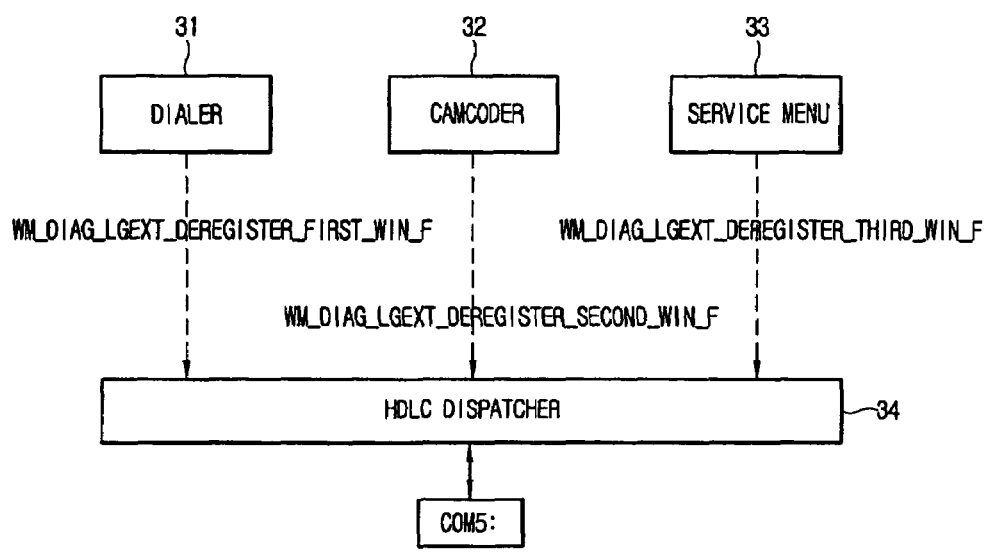

MODEM SHARING DEVICE OF PDA PHONE AND METHOD THEREOF

CROSS-REFERENCE TO RELATED APPLICATIONS

Pursuant to 35 U.S.C. §119(a), this application claims the benefit of earlier filing date and right of priority to Korean Application No. 18113/2004, filed on Mar. 14, 2004, the contents of which are hereby incorporated by reference herein in their entirety.

BACKGROUND OF THE INVENTION

1. Field of the Invention

The present invention relates to a PDA phone, and more particularly, to a model sharing device of a PDA phone and a method thereof.

2. Description of the Conventional Art

Generally, a PDA phone has one modem, and the modem of the PDA phone is channelized with a CPU of the PDA phone through one universal asynchronous receiver/transmitter (UART). A representative application of the modem includes a dialer and a browser. The two applications can respectively write or read a desired command in the modem by using one port. However, in an operating system such as a pocket personal computer (PC), one port can not be simultaneously used by plural applications thereby to use a virtual COM.

A modem sharing device of a PDA phone according to the conventional art will be explained with reference to FIGS. 1 and 2.

FIG. 1 shows a modem sharing device of a PDA phone used in a POZ produced in a company called Cyber Bank in accordance with the conventional art.

As shown in FIG. 1, the conventional modem sharing device of a PDA phone comprises: a browser 11; a dialer 12; AT command parsers respectively attached to the browser 11 and the dialer 12; a Slmip.dll module 13 having a plurality of virtual ports SMP1~SMP6; a Serial.dll module 14 having ports, COM1 and COM 4; and a modem.

The conventional modem sharing device of a PDA phone and a method thereof will be explained in more detail as follows.

The conventional modem sharing device of a PDA Phone used in a product, POZ produced by Cyber Bank uses an AT command protocol.

The browser 11 and the dialer 12 are applications of the PDA phone, and respectively generate commands.

The command parsers 11-1 and 12-1 respectively attached to the browser 11 and the dialer 12 parse a command to be transmitted by the browser 11 and a command to be transmitted by the dialer 12 by using an AT command protocol. The AT command parsers 11-1 and 12-1 transmit the parsed commands to the Slmip.dll module 13.

The Slmip.dll module 13 having a plurality of virtual ports SMP1~SMP6 assigns a command to be transmitted by the parsed browser 11 to the SMP 1, and assigns a command to be transmitted by the parsed dialer 12 to the SMP 2. The commands assigned to the SMP 1 and the SMP 2 are transmitted to the modem through one port COM4 of the Serial.dll module 14.

The modem 15 reversely parses the transmitted commands by the AT command protocol method thereby to restore the original commands.

According to this, the plural applications 11 and 12 of the PDA phone can share one modem 15 by using the Slmip.dll module 13 and the Serial.dll module 14.

Hereinafter, the conventional modem sharing device of a PDA phone using a high-level data link control (HDLC) protocol not the AT command protocol will be explained with reference to FIG. 2.

FIG. 2 is a schematic view showing another modem sharing device of a PDA phone in accordance with the conventional art.

As shown in FIG. 2, another conventional modem sharing device of a PDA phone comprises: a dialer 21; a camcorder 22; a service menu 23; a plurality of HDLC dispatchers 21-1, 22-1, and 23-1 respectively attached to the dialer 21, the camcorder 22, and the service menu 23; a Serial.dll module 24 having a port, COM 5; and a modem 25.

Said another conventional modem sharing device of a PDA phone will be explained in more detail as follows.

The dialer 21, the camcorder 22, and the service menu 23 generate commands as applications of the PDA phone like the browser 11 and the dialer 12 of FIG. 1.

The HDLC dispatchers 21-1, 22-1, and 23-1 perform the same functions as the AT command parsers 11-1 and 12-1 and the Slmip.dll module 13 of FIG. 1, and are respectively attached to the dialer 21, the camcorder 22, and the service menu 23. The HDLC dispatchers parse commands to be transmitted by the dialer 21, the camcorder 22, and the service menu 23 by using an HDLC protocol. Then, the HDLC dispatchers 21-1, 22-1, and 23-1 transmit the parsed commands to the port, COM 5 of the Serial.dll module 24.

The modem 25 reversely parses the commands transmitted through the port, COM 5 thereby to restore the generated commands.

Therefore, the plural applications of the PDA phone can share one modem by using the Slmip.dll module and the Serial.dll module.

However, in the conventional modem sharing device of a PDA phone, the same parsing module for parsing commands generated by the plural applications is respectively attached to the plural applications. According to this, a redundancy that occupies a memory is generated thereby not to share one modem efficiently.

SUMMARY OF THE INVENTION

Therefore, an object of the present invention is to provide a modem sharing device of a PDA phone capable of efficiently sharing a modem by constructing one parsing module respectively attached to a plurality of applications of the PDA phone in order to parse commands of the plurality of applications.

To achieve these and other advantages and in accordance with the purpose of the present invention, as embodied and broadly described herein, there is provided a modem sharing device of a PDA phone comprising: a plurality of applications; one parsing module for parsing commands generated by the plurality of applications and distributing the parsed commands; a transmission module for transmitting the distributed commands through one port; and a modem for receiving the transmitted commands.

To achieve these and other advantages and in accordance with the purpose of the present invention, as embodied and broadly described herein, there is also provided a modem sharing method of a PDA phone comprising: a registration step that a plurality of applications register to a modem for use through one parsing module; a request step that the plurality of applications transmit each request packet to the modem through one parsing module and request each response packet according to the transmitted request packet; and a response step that the plurality of applications receive each response packet according to the request packet through one parsing module.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7 is an exemplary view showing one embodiment of a report packet switching step of the modem sharing method of a PDA phone according to the present invention; and FIG. 8 is an exemplary view showing one embodiment of a registration releasing step of the modem sharing method of a PDA phone according to the present invention.

DETAILED DESCRIPTION OF THE PREFERRED EMBODIMENTS

Reference will now be made in detail to the preferred embodiments of the present invention, examples of which are illustrated in the accompanying drawings.

Hereinafter, a modem sharing device of a PDA phone capable of efficiently sharing a modem by constructing one parsing module respectively attached to a plurality of applications of the PDA phone in order to parse commands of the plurality of applications, and preferred embodiments of a method thereof will be explained in more detail with reference to FIGS. 3 to 8.

Figure 1:
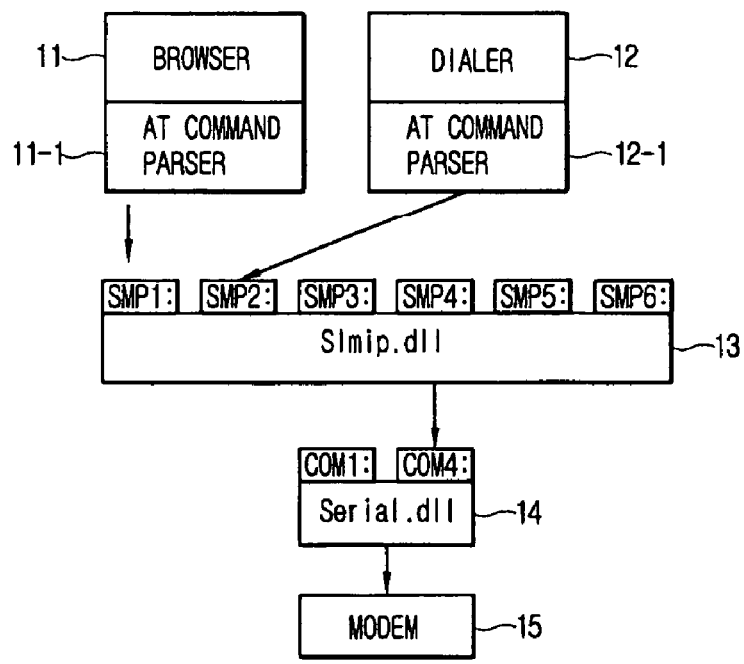
FIG. 1 is a block diagram showing a modem sharing device of a PDA phone in accordance with the conventional art.
Figure 2:
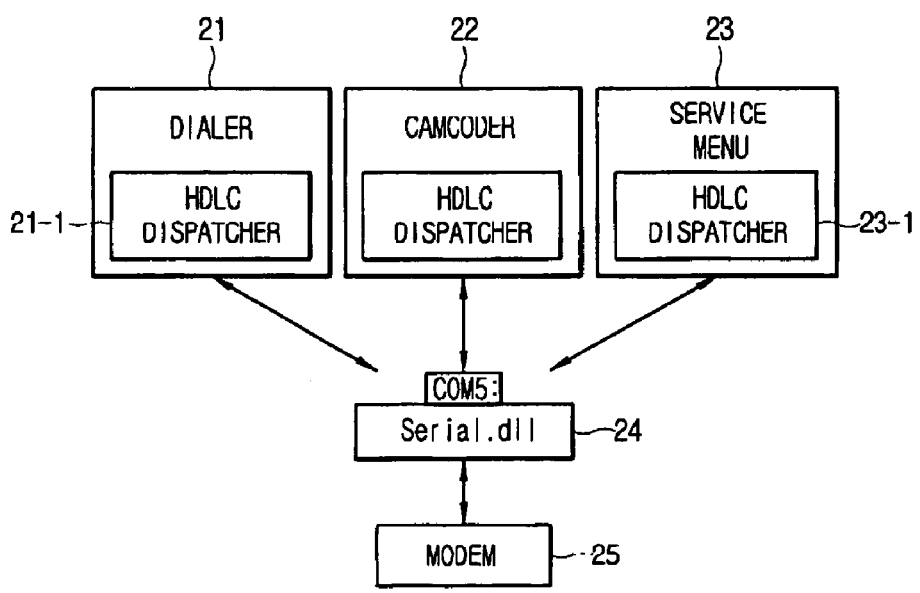
FIG. 2 is a block diagram showing another modem sharing device of a PDA phone in accordance with the conventional art.
Figure 3:
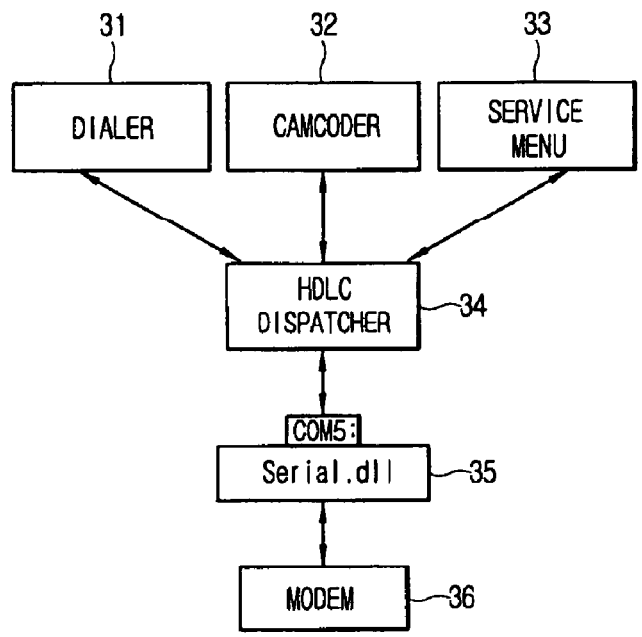
FIG. 3 is a block diagram showing a modem sharing device of a PDA phone according to the present invention.

FIG. 3 is a block diagram showing a modem sharing device of a PDA phone according to the present invention.

As shown, the modem sharing device of a PDA phone according to the present invention comprises: a plurality of applications 31 to 33; one parsing module 34 for parsing commands generated by the plurality of applications and distributing the commands; a transmission module 35 for transmitting the distributed commands through one port; and a modem 36 for receiving the transmitted commands.

Hereinafter, an operation of the modem sharing device of a PDA phone according to the present invention will be explained in more detail with reference to FIG. 4.

Figure 4:
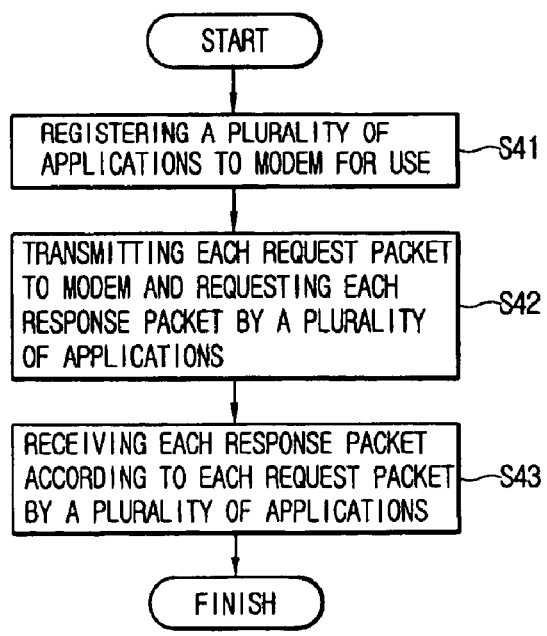
FIG. 4 is a flow chart showing a modem sharing method of a PDA phone according to the present invention.

FIG. 4 is a flow chart showing a modem sharing method of a PDA phone according to the present invention.

As shown, the modem sharing method of a PDA phone comprises: a registration step that a plurality of applications register to a modem for use through one parsing module (S41); a request step that the plurality of applications transmit each request packet to the modem through one parsing module and request each response packet according to the transmitted request packet (S42); and a response step that the plurality of applications receive each response packet according to the request packet through one parsing module (S43).

The modem sharing method of a PDA phone according to the present invention further comprises: a switching step for transmitting a report packet transmitted from the modem to a corresponding application; and a registration releasing step for stopping a modem usage of an application that does not require to use the modem any longer among the plurality of applications.

The modem sharing method of a PDA phone according to the present invention will be explained in more detail as follows.

First, the registration step will be explained with reference to FIG. 5.

Figure 5:
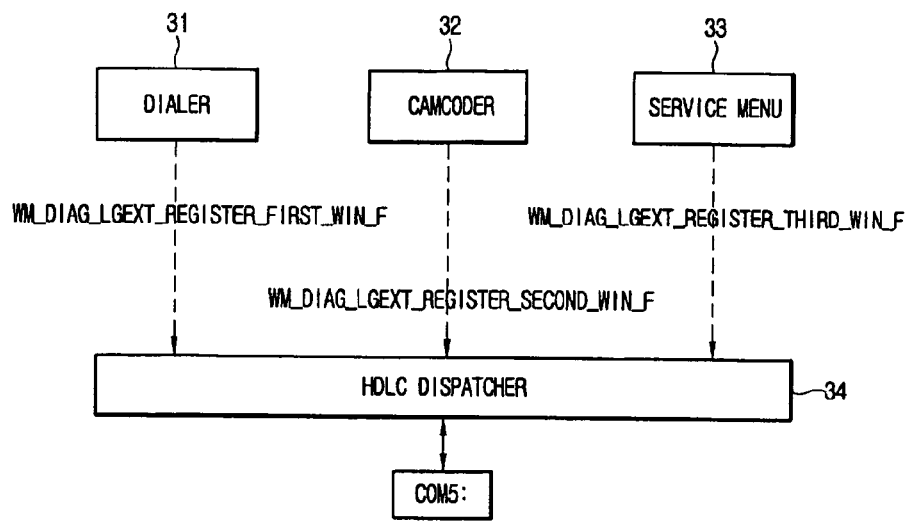
FIG. 5 is an exemplary view showing one embodiment of a registration step of the modem sharing method of a PDA phone according to the present invention.

FIG. 5 is an exemplary view showing one embodiment of a registration step of the modem sharing method of a PDA phone according to the present invention.

As shown, the registration step S41 is a step for registering each application to the modem for use. Even if the registration method can be implemented variously, a window message transmission method is used in the preferred embodiment of the present invention.

The registration step includes: generating commands by the plurality of applications; parsing the generated commands by the one parsing module; distributing the parsed commands and transmitting the distributed commands to the modem through one port; and receiving the transmitted commands by the modem and reversely-parsing the commands.

As shown in FIG. 5, in the registration step, the plurality of applications 31 to 33 transmit each command to one parsing module, that is, one HDLC dispatcher 34 in order to register to a modem for use. Then, the one HDLC dispatcher 34 parses the transmitted commands. It is preferable that the parsing module parses the commands by an HDLC protocol. A 'WM_DIAG_LGEXT_REGISTER_FIRST_WIN_F' is a window message that the dialer 31, the first application registers to the modem for use, a 'WM_DIAL_LGEXT_REGISTER_SECOND_WIN_F' is a window message that the camcorder 32, the second application registers to the modem for use, and a 'WM_DIAL_LGEXT_REGISTER_THIRD_WIN_F' is a window message that the service menu 33, the third application registers to the modem for use. By transmitting the above window messages, the plurality of applications can register to one modem for use (S41). The commands started with 'WM' are window messages transmitted to the parsing module, that is, the HDLC dispatcher by the plurality of applications.

Next, the request step and the response step will be explained with reference to FIG. 6.

Figure 6:
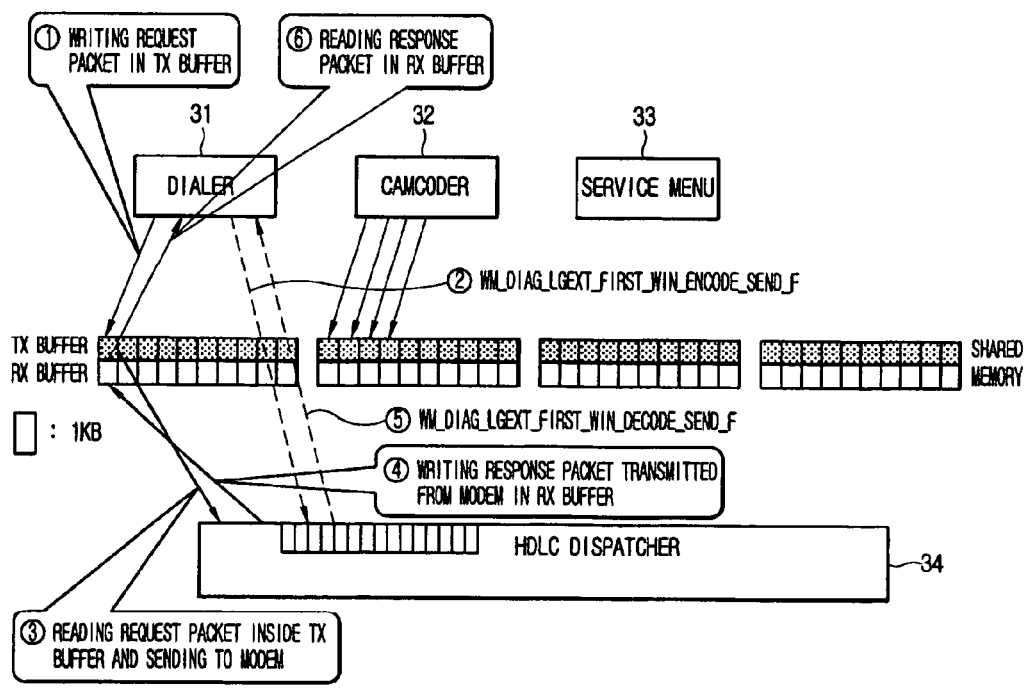
FIG. 6 is an exemplary view showing one embodiment of a request step and a response step of the modem sharing method of a PDA phone according to the present invention.

FIG. 6 is an exemplary view showing one embodiment of a request step and a response step of the modem sharing method of a PDA phone according to the present invention.

The request step S42 is a step that each application transmits a request packet to the modem in order to receive a necessary response. The request step includes: sequentially storing each request packet in a shared memory by the plurality of applications; and parsing the stored request packets and then transmitting the parsed request packets to the modem by the one parsing module.

The response step S43 is a step that each application receives a response packet according to the request packet from the modem. The response step includes: sequentially storing the response packets transmitted from the modem in a shared memory by the one parsing module; and reading the stored response packets by the plurality of applications.

The shared memory is respectively provided with 10 TX buffers and 10 RX buffers, each buffer having 1 Kb, and the plurality of applications 31 to 33 and the HDLC dispatcher 34 can commonly write packets in the TX buffers and the RX buffers of the shared memory and read packets. Preferably, the plurality of applications 31 to 33 and the HDLC dispatcher 34 write packets in the TX buffers and the RX buffers of the shared memory by a circular queue method. In order to prevent packets from being overwritten in the TX buffers and the RX buffers, 1~10 packets are sequentially recorded in the ten buffers, and $11^{th}$ packet is again recorded in the first buffer.

As shown in FIG. 6, the dialer 31 stores the request packets in the TX buffers according to an order registered in the register step in order to receive the response packets from the modem of the PDA phone. Then, the dialer 31 transmits the window message of "WM_DIAG_LGEXT_REGISTER_FIRST_WIN_F' to the HDLC dispatcher in order to inform that the request packets have been stored in the TX buffers. The HDLC dispatcher 34 reads the request packets stored in the TX buffers on the basis of the transmitted window message, parses, and then transmits the request packets to the modem through one port, COM5 (S42).

The HDLC dispatcher 34 sequentially stores the response packets transmitted from the modem in the RX buffers of the shared memory. Then, the HDLC dispatcher 34 transmits a window message of "WM_DIAG_LGEXT_FIRST_WIN_DECODE_SEND_F' to the dialer 31 in order to inform that the response packets have been stored in the RX buffers. The dialer 31 reads the response packets stored in the RX buffers on the basis of the window message transmitted to the dialer 31, thereby receiving a response according to the request packet (S43).

The request packets are packets for the applications of the PDA phone to receive each response from the modem. For example, as the request packet, the dialer rings a phone, the camcorder transmits a stored moving image file, and the service menu transmits modem setting values. Also, the response packets are packets informing each response of the modem for the request packets. For example, the response packets include "The calling has been successfully peformed", "The moving image file has been successfully transmitted", "The modem setting values have been successfully transmitted", etc.

The HDLC dispatcher 34 preferably parses packets by an HDLC protocol.

However, the HDLC dispatcher 34 does not always receive the response packets according to the request packets of the plurality of applications. That is, even when the request packets are not transmitted to the modem, a packet can be transmitted from the modem to the HDLC dispatcher. At this time, the transmitted packet is called as a report packet. For example, the report packet includes a ring packet generated when a phone rings, etc. According to this, the HDLC dispatcher 34 needs to perform a step for transmitting the report packet to a corresponding application, that is, a switching step.

The switching step will be explained with reference to FIG. 7.

FIG. 7 is an exemplary view showing one embodiment of a report packet switching step of the modem sharing method of a PDA phone according to the present invention.

The switching step is a step for transmitting a report packet transmitted from the modem to a corresponding application among the plurality of applications by an assignment.

As shown in FIG. 7, the HDLC dispatcher 34 judges a kind of a report packet transmitted from the modem and transmits the report packet to a corresponding application. For example, "DIAG_LGEXT_CALL_REQUEST_RPT_F" is a report packet received until the other party receives a phone after a PDA phone gives a ring to the other party, that is, a report packet informing that a calling is being performed. Also, "DIAG_LGEXT_RING_RPT_F" is a report packet received when a phone rings from the other party, "DIAG_LGEXT_VOICE_RECORD_F" is a report packet informing that a camcorder application starts a recording, and "DIAG_LGEXT_VOC_REC_DATA_RPT_F" is a report packet denoting an audio data report packet included when the camcorder application starts a recording. Also, "in case of TEST mode" indicates a state that a service menu has been performed. Accordingly, report packets such as "DIAG_LGEXT_VOICE_RECORD_F", "DIAG_LGEXT_VOC_REC_DATA_RPT_F", etc. are not transmitted to the dialer application. Also, in case of the TEST mode, report packets such as "DIAG_LGEXT_CALL_REQUEST_RPT_F", "DIAG_LGEXT_RING_RPT_F", "DIAG_LGEXT_CALL_HANGUP_RPT_F", etc. are not transmitted to the dialer application (S71). Also, report packets such as "DIAG_LGEXT_VOICE_RECORD_F", "DIAG_LGEXT_VOC_REC_DATA_RPT_F", etc. are transmitted to the camcorder application (S72). Also, in case of the TEST mode, report packets such as "DIAG_LGEXT_CALL_REQUEST_RPT_F", "DIAG_LGEXT_RING_RPT_F", "DIAG_LGEXT_CALL_HANGUP_RPT_F", etc. are transmitted to the service menu application (S73).

While the request step, the response step, and the switching step are repeated, if one of the plurality of applications is to stop a usage of the modem, the registration release step is performed.

The registration release step will be explained with reference to FIG. 8.

FIG. 8 is an exemplary view showing one embodiment of a registration releasing step of the modem sharing method of a PDA phone according to the present invention.

As shown, the registration release step is similar to the registration step. An application that does not require to use the modem any longer among the plurality of applications transmits a registration release window message to the HDLC dispatcher 34. That is, the first registered application, that is, the dialer 31 transmits a window message, "WM_DIAG_LGEXT_DEREGISTER_FIRST_WIN_F" to the HDLC dispatcher 34, the second registered application, that is, the camcorder 32 transmits a window message, "WM_DIAG_LGEXT_DEREGISTER_SECOND_WIN_F" to the HDLC dispatcher 34, and the third registered application, that is, the service menu 33 transmits a window message, "WM_DIAG_LGEXT_DEREGISTER_THIRD_WIN_F" to the HDLC dispatcher 34. An application that has transmitted the window message is registration-released, and does not receive a response packet and a report packet from the modem any longer.

The above applications are not limited to three, and applications more than three can be constructed.

As aforementioned, in the modem sharing device of a PDA phone and the method thereof, one parsing module is respectively attached to a plurality of applications of the PDA phone in order to parse commands of the plurality of applications, thereby efficiently sharing a modem.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A modem sharing device of a personal digital assistant (PDA) phone comprising:
   a plurality of applications;
   one parsing module for parsing commands generated by the plurality of applications, sequentially storing the parsed commands in a transmission buffer of a shared memory, and distributing the parsed commands;
   a transmission module for transmitting the distributed commands through one port; and
   a modem for receiving the transmitted commands.

2. The device of claim 1, wherein the parsing module parses the commands by a high-level data link control (HDLC) protocol.

3. The device of claim 2, wherein the parsing module sequentially stores response packets transmitted from the modem in a receiving buffer of the shared memory.

4. The device of claim 1, wherein the applications comprise a dialer, a camcorder, and a service menu.

5. The device of claim 1, wherein the parsing module determines a kind of a report packet transmitted from the modem and transmits the report packet to a corresponding application.

6. A modem sharing method of a personal digital assistant (PDA) phone comprising:
   a registration step in which a plurality of applications register to a modem for use through one parsing module;
   a request step in which each of the plurality of applications transmit a request packet to the modem through the one parsing module and request a corresponding response packet according to the transmitted request packet; and
   a response step in which each of the plurality of applications receive the corresponding response packet according to the request packet through the one parsing module,
   wherein the registration step comprises the plurality of applications generating commands, and the one parsing module parsing the generated commands and sequentially storing the parsed commands in a transmission buffer of a shared memory.

7. The method of claim 6, wherein the registration step further comprises:
   distributing the parsed commands;
   transmitting the distributed commands to the modem through one port; and
   the modem receiving the transmitted commands and reversely-parsing the commands.

8. The method of claim 6, wherein the request step includes:
   each of the plurality of applications sequentially storing the request packet in the shared memory; and
   the one parsing module parsing the stored request packets and then transmitting the parsed request packets to the modem.

9. The method of claim 8, wherein in the request step, the one parsing module stores the request packets in the transmission buffer of the shared memory.

10. The method of claim 8, wherein the shared memory is provided with 10 transmission buffers and 10 receiving buffers.

11. The method of claim 8, wherein the each of the plurality of applications stores the request packet in the shared memory by a circular queue method.

12. The method of claim 6, wherein the response step includes:
    the one parsing module sequentially storing the corresponding response packets in the shared memory; and
    each of the plurality of applications reading the sequentially stored response packets.

13. The method of claim 12, wherein in the response step, the one parsing module stores the request packets in a receiving buffer of the shared memory.

14. The method of claim 12, wherein the one parsing module stores the response packets in the shared memory by a circular queue method.

15. The method of claim 6, wherein the one parsing module parses the request packets by using a high-level data link control (HDLC) protocol.

16. The method of claim 6, wherein the plurality of applications comprise a dialer, a camcorder, and a service menu.

17. The method of claim 6, further comprising transmitting a report packet from the modem to a corresponding application according to an assignment.

18. The method of claim 6, further comprising a registration releasing step for stopping use of the modem by at least one of the plurality of applications which no longer requires use of the modem.

19. A modem sharing device for a phone comprising:
    two or more applications;
    single parsing module for parsing commands generated by the two or more applications, sequentially storing the parsed commands in a shared memory transmission buffer, and distributing the parsed commands;
    a transmission module for transmitting the distributed commands through a single port; and
    a modem for receiving commands.

20. The device of claim 19, wherein the parsing module parses the commands using high-level data link control (HDLC) protocol.

21. The device of claim 20, wherein the parsing module sequentially stores response packets from the modem in a shared memory receiving buffer.

22. The device of claim 19, wherein the two or more applications comprise at least two of a dialer, a camcorder, and a service menu.

23. The device of claim 19, wherein the parsing module determines a type of a received report packet and transmits the report packet to a corresponding application.

24. A modem sharing method of a phone, the method comprising:
    registering two or more applications to a modem for use through a single parsing module;
    transmitting a request packet from each of the two or more applications to the modem through the single parsing module, each request packet requesting a corresponding response packet according to the request packet; and each of the two or more applications receiving the response packet corresponding to the request packet through the single parsing module, wherein the registering the two or more applications comprises the two or more applications generating commands, and the single parsing module parsing the generated commands and sequentially storing the parsed commands in a shared memory transmission buffer.

25. The method of claim 24, wherein registering the two or more applications further comprises:

distributing the parsed commands;

transmitting the distributed commands to the modem through the single port; and the modem reversely-parsing the distributed commands.

26. The method of claim 24, wherein the transmitting the request packet comprises:

each of the two or more applications sequentially storing the request packet in the shared memory; and the single parsing module parsing the stored request packets and then transmitting the parsed request packets to the modem.

27. The method of claim 26, wherein transmitting the request packet comprises the single parsing module storing the request packets in the shared memory transmission buffer.

28. The method of claim 26, wherein the shared memory is comprises 10 transmission buffers and 10 receiving buffers.

29. The method of claim 26, further comprising each of the two or more applications storing the received request packet in the shared memory using a circular queue process.

30. The method of claim 24, wherein each of the two or more applications receiving the response packet comprises:

the single parsing module sequentially storing the corresponding response packets in the shared memory; and each of the two or more applications reading the sequentially stored response packets.

31. The method of claim 30, wherein each of the two or more applications receiving the response packet comprises the single parsing module storing the request packets in a shared memory receiving buffer.

32. The method of claim 30, wherein the one parsing module stores the received response packets in the shared memory using a circular queue process.

33. The method of claim 24, wherein the single parsing module parsing the request packets comprises using a high-level data link control (HDLC) protocol.

34. The method of claim 24, wherein the two or more applications comprise at least two of a dialer, a camcorder, and a service menu.

35. The method of claim 24, further comprising the modem transmitting a report packet to a corresponding application according to an assignment.

36. The method of claim 24, further comprising at least one of the two or more applications that no longer requires use of the modem stopping use of the modem.

* * * * *